J. BISSONETT.
MILK COOLER.

No. 191,513. Patented June 5, 1877.

Witnesses:
P. C. Dieterich
F. H. Duffy

Inventor:
Joseph Bissonett
Per Charles E. Allen, Attorney.

N. PETERS, PHOTO-LITHOGRAPHER, WASHINGTON, D. C.

UNITED STATES PATENT OFFICE.

JOSEPH BISSONETT, OF JERICHO, VERMONT.

IMPROVEMENT IN MILK-COOLERS.

Specification forming part of Letters Patent No. 191,513, dated June 5, 1877; application filed February 19, 1877.

*To all whom it may concern:*

Be it known that I, JOSEPH BISSONETT, of Jericho, in the county of Chittenden and State of Vermont, have invented a new and useful Improvement in Milk-Coolers, of which the following is a specification:

The object of the present invention is to effect certain new and useful improvements in the method employed for removing the animal heat from the milk with as little delay as is practicable. These improvements consist in constructing the water-vat, made of leaded tin, which supports the milk-pan, so that the current of water which enters one end of the vat by the induction-pipe is first chilled by passing through an ice-chamber, which is attached to the vat, and from thence it flows through the open spaces between the ends of the partitions and the sides of the vat. These partitions extend transversely from either side of and nearly across the vat, alternately, until the stream reaches the eduction-pipe at the other extremity of the vat, and through which the water passes out. These partitions, which are so arranged as to secure a complete circulation of the water, are intended also to sustain the milk-pan. Their number will vary according to the size of the pan and the extent of the surface to be supported and cooled.

By this simple method the vat is filled with a continuous current of cold water, which is compelled, by the location of the partitions, to pass through the vat in a circuitous manner, thus exposing the whole under surface of the milk-pan to a rapid cooling process, thereby preventing the formation of lactic acid, delaying the souring of the milk, and arresting any germs of putrefaction which may be present.

A continuous goose-neck tube, the top of which is the same height as that of the partitions, passes through the bottom of the vat, for the purpose of emptying the milk-pan, by means of a corresponding outlet in the bottom of the pan, the end of which is inserted into the tube when the pan is in place. This tube can be, at any time, effectually cleansed by means of a pipe which leads directly into it from the bottom of the vat.

Figure 1:
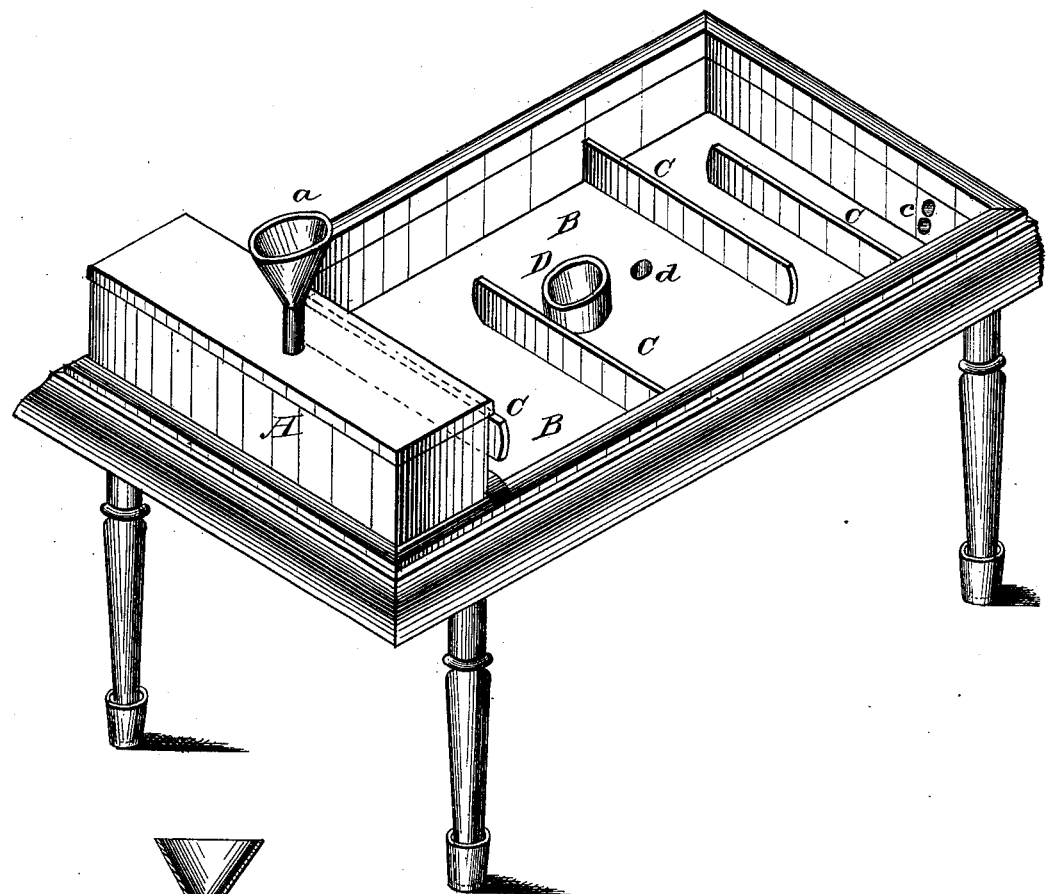
Figure 2:
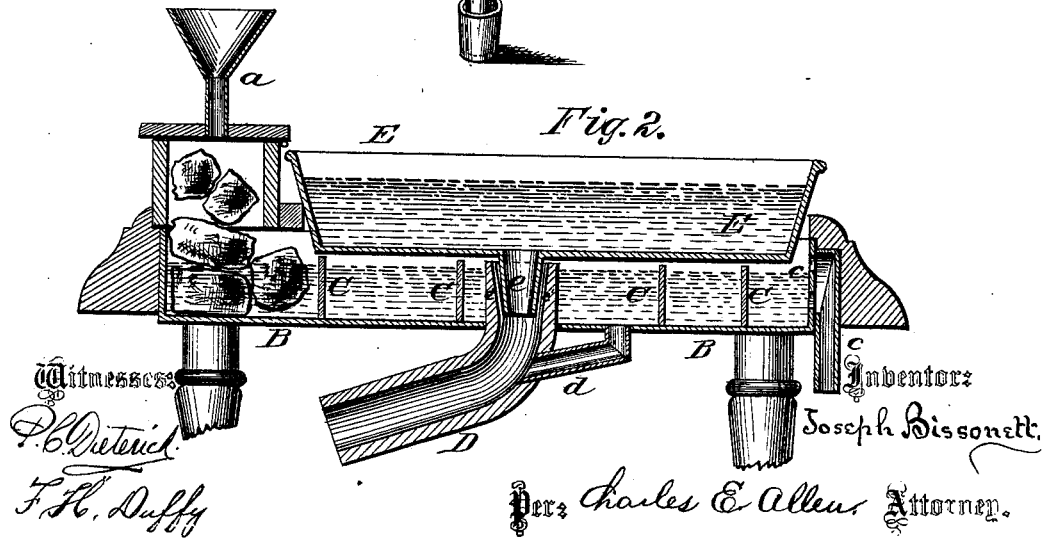

In the drawings, Figure 1 represents a perspective view of the improved milk-cooler without the pan. Fig. 2 is a longitudinal section of the same, with the addition of the pan.

Through the supply-pipe $a$ the water enters the ice-chamber A, where it becomes thoroughly cooled by its contact with the ice. At this reduced temperature it then enters the water-vat B, which is made of leaded tin, through which it flows, passing, in its course, alternately from one side of the vat B to the other, in order to flow through the spaces between the extremities of the partitions C C C C and the sides of the vat B, and finally discharging itself through the eduction-pipe $c$. The position of the openings to this discharge-pipe $c$ may be varied according to the depth of the water desired in the vat B.

D is a goose-neck tube, intended to draw off the milk contained in the milk-pan E.

The pan E rests upon the transverse partitions C C, and is removable, and its outlet $e$ enters the raised open end $e'$ of the tube D. It is not essential that the tube D should be of the particular form shown. This tube is readily and thoroughly cleaned by water passing through it from the pipe $d$, or the water removed for any purpose, which can be done without removing the pan E, by means of a valve arranged therein, thereby securing great convenience in practically operating the cooler. It is more readily cleaned by drawing through it the water from the vat B, by means of the pipe $d$.

When the milk-pan E is in position, its outlet $e$ is inserted into the upper end of the tube D. The upper openings of the outlet $e$ and the pipe $d$ are intended to be closed when not in use.

The current of the water through the cooler is regulated by raising or depressing the end of the vat B which contains the ice.

What I claim, and desire to secure by Letters Patent, is—

1. The water-vat B, made of leaded tin, provided with an outlet-tube, D, and the pipe $d$, arranged as described, for the purpose set forth.

2. The water-vat B, provided with an outlet-tube D $e'$, and the pipe $d$, arranged as described, in combination with a removable pan, E, having an outlet-tube, $e$, arranged as described, for the purpose set forth.

JOSEPH BISSONETT.

Witnesses:
CHARLES E. ALLEN,
JOHN W. PERCIVAL.